April 7, 1970  R. D. HIPP, JR  3,504,967
TRANSPARENCY AND SOUND TRACK SUPPORTING ASSEMBLY
Filed April 4, 1968  2 Sheets-Sheet 1
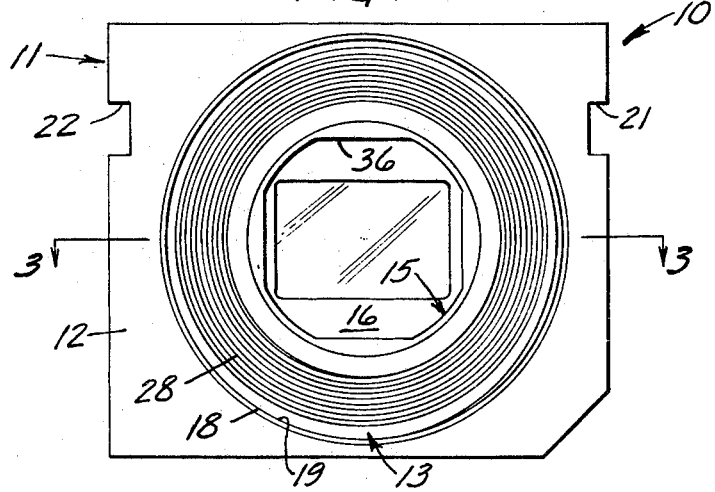
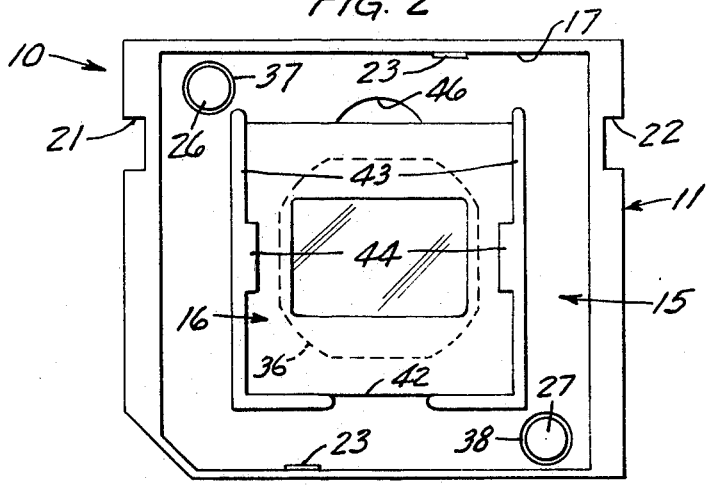
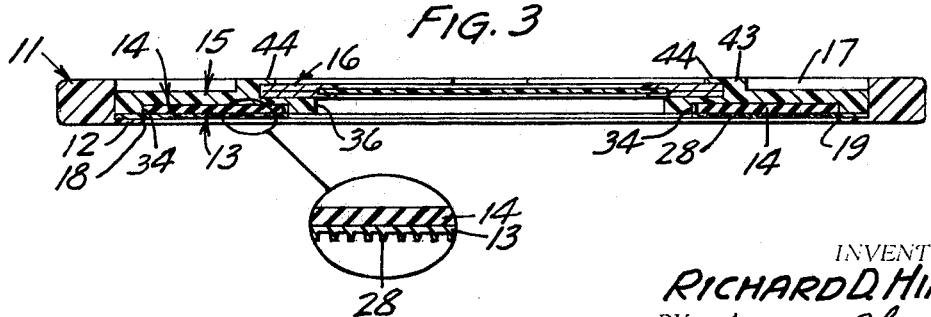
INVENTOR.
RICHARD D. HIPP, JR.
BY Kinney, Alexander,
Sell, Steldt & DeLaHunt
ATTORNEYS April 7, 1970  R. D. HIPP, JR  3,504,967
TRANSPARENCY AND SOUND TRACK SUPPORTING ASSEMBLY
Filed April 4, 1968  2 Sheets-Sheet 2
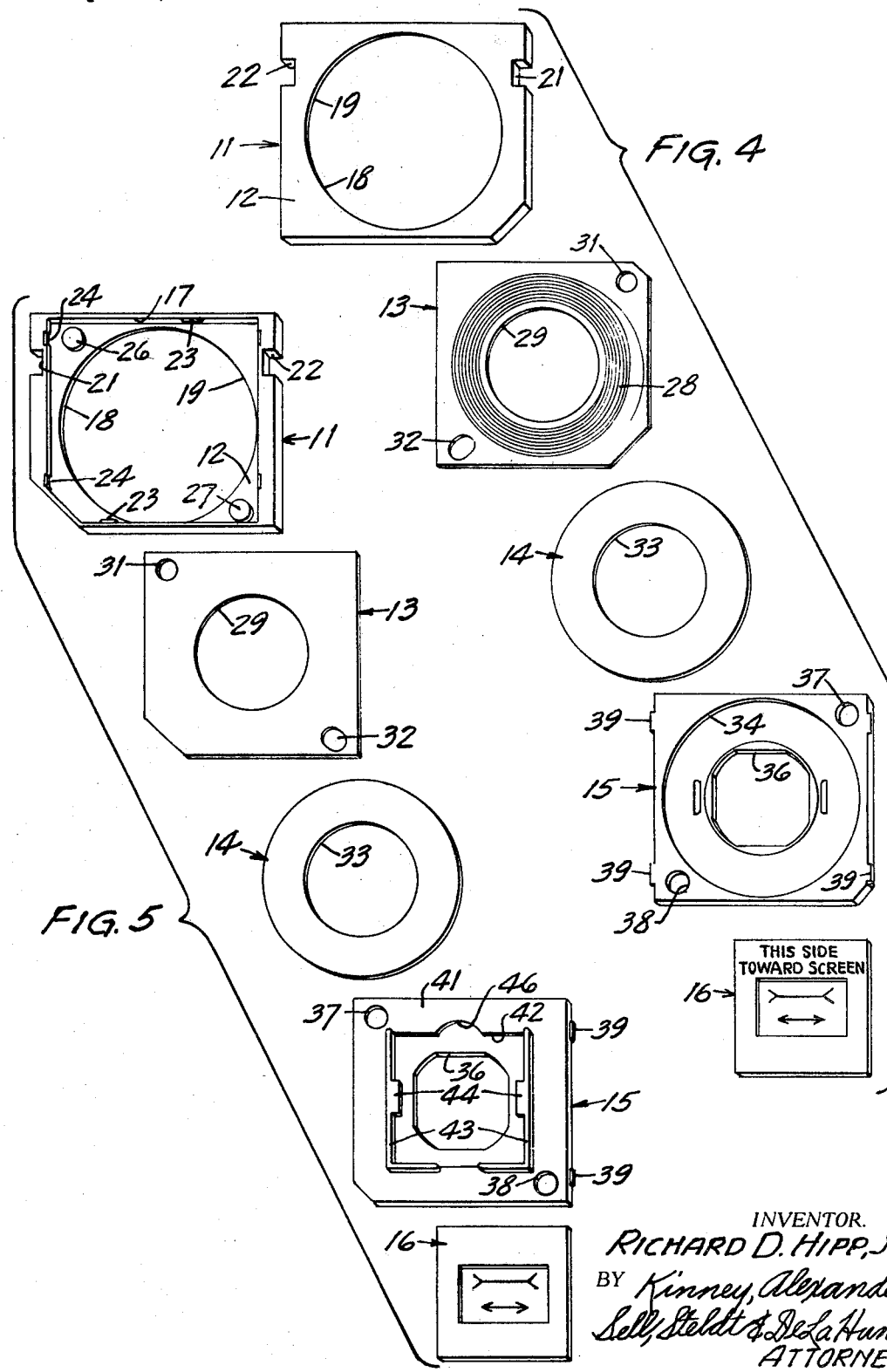
INVENTOR.
RICHARD D. HIPP, JR.
BY Kinney, Alexander,
Sell, Steldt & DeLaHunt
ATTORNEYS United States Patent Office 3,504,967
Patented Apr. 7, 1970

3,504,967
TRANSPARENCY AND SOUND TRACK SUPPORTING ASSEMBLY
Richard D. Hipp, Jr., Circle Pines, Minn., assignor to Minnesota Mining and Manufacturing Company, St. Paul, Minn., a corporation of Delaware
Filed Apr. 4, 1968, Ser. No. 718,855
Int. Cl. G03b 21/00, 31/06
U.S. Cl. 353—120                                       8 Claims

ABSTRACT OF THE DISCLOSURE

A transparency and sound track supporting assembly affording facile production of the assembly, and interchangeability and replacement of the transparency and of the sound track supporting medium of the assembly. The assembly comprises an outer frame, a sound track supporting member, a resilient pad, and a plate which snaps into a recess in said outer frame to retain the member and pad and which plate has a pocket to support a transparency.

---

This invention relates to apparatus for the simultaneous reproduction of audio signals and the projection of graphic material and finds particular utility in the presentation of material for eduction, advertising or entertainment. The present invention is directed toward providing a number of manufactured parts which are easily joined to form an audio-visual projection assembly. The assembly permits interchangeability and replacement of both the transparency and the sound track supporting medium as desired without danger of destroying the entire unit, the sound track supporting medium, or the transparency.

The audio-visual projection assembly of the present invention is adapted to carry a centrally disposed optically projectable transparency and has a fixed audibly reproducible sound track arranged in a continuous multiturn spiral path encircling the projectable area of the transparency. The prior art discloses the combination of a sound track with a transparency and reference is made to U.S. Letters Patent Nos. 2,961,922; 3,122,053; 3,240,-117; 3,282,154; and 3,302,520. The first of these patents discloses several modifications of a transparency and sound track supporting frame, and the frame illustrated in FIGURE 18 of this patent provides the most compact unit with the greatest length to the sound track but utilizes a sound track supporting medium rotatably mounted on the frame and disposed about the projection opening for the transparency. This system was improved upon by the later-mentioned patents disclosing slide and sound track carriers having a stationary sound track medium on a transparency supporting frame, and one form of slide holder has a definite spiral sound track defined on one face of the medium or formed on the frame. In all of the known prior art devices where the sound carrier is stationary during reproduction of the audio information the sound track supporting medium is secured to the frame by adhesive or other bonding means. In all of these constructions it is therefore virtually impossible to replace one sound track supporting member for another without destroying the slide assembly or to interchange the sound supporting medium on one slide holder with that on another, if desired, without destroying the medium or other parts of the frame.

The present invention overcomes the disadvantages of these prior-known assemblies but yet utilizes the novel concept of positioning a spiral-shaped sound track about the axes of the transparency to have on a small easily handled tablet a sound track of sufficient length to adequately describe most any graphic material on the transparency.

The present invention provides a novel assembly comprising a main outer frame, a sound track supporting medium, a resilient pad, and a plate which has a snap fit with the main frame to retain the sound track supporting medium and the pad in sandwiched condition between the plate and the main frame. The plate is also formed to permit easy insertion and removal of conventionally mounted 35 mm. or 127 type slides in position over a window through the assembly. The main frame and the sound track supporting medium are each formed with cooperating means for locating the sound track relative to the main frame to properly position the sound track in the frame for recording or reproducing signals thereon.

This assembly eliminates the use of adhesive which has previously been used to bond pieces of magnetic oxide coated material to the face of the frame, which adhesive caused ripples to appear on the surface, resulting in drop-outs and poor fidelity when recording or reproducing signals imparted thereto. Further, this assembly avoids the need for any equipment to properly locate and seal such pieces together.

The above and other features and advantages of the present invention will be more fully understood after reading the following detailed description which refers to the accompanying drawing wherein:

FIGURE 1 is a front view of the assembly;
FIGURE 2 is a rear elevational view of the assembly;
FIGURE 3 is a sectional view taken along the lines 3—3 of FIGURE 1;
FIGURE 4 is an exploded perspective front view of the elements of the assembly; and
FIGURE 5 is an exploded perspective rear view of the elements of the assembly.

The audio-visual projection unit 10 is generally rectangular. The front face of the assembly exposes the sound track permitting engagement therewith by a recording and/or pick-up means, for example a magnetic transducer, and the assembly is provided with a central window over which a transparency may be positioned for projection from a machine having the conventional projection system.

The audio-visual projection assembly comprises a main outer frame 11 having a planar front wall 12 and the back recessed to receive a sound track supporting member 13, an annular resilient pad 14, and a plate 15 which carries on its rear surface a pocket for receiving a transparency or slide 16 including a slide mount and transparency.

The rectangular main outer frame 11 is preferably molded from a high-impact, styrene-type, rigid, thermoplastic resin such as "Cycolac" sold by Marbon Chemical Division of Borg-Warner Corporation, Gary, Ind., U.S.A. The main frame 11 has a recess 17 on the back surface, and the remaining front wall 12 is provided with a large centrally disposed circular aperture 18 defined by a radially inwardly beveled wall 19 to provide an inclined edge at the front surface. The peripheral rib or edges of the frame 11 are provided near the top with opposed recesses 21 and 22 adapting the assembly to be engaged by fingers on a slide changing mechanism to move the assembly into and out of a suitable audio recording and/or reproducing and image-projection apparatus. The walls defining the recess 17 are formed with detents 23 and recesses 24 to permit a snap fit with the plate 15. Projecting toward the rear of the main frame from wall 12 and disposed within the recess 17 at diametrically opposite sides of the opening are bosses 26 and 27 affording means for locating the sound track supporting member 13 accurately within the recess 17.

The sound track supporting member 13 illustrated is a thin generally rectangular flexible sheet having a magnetizable surface on the front side and may, for example, comprise a film of polyvinylchloride having a magnetizable coating. The member is embossed on the front face to define a spiral sound track 28 making a plurality of revolutions within a given radial dimension and is formed with a central opening 29 and a pair of diagonally disposed holes 31 and 32 which receive the bosses 26 and 27 disposed in the recess of the main frame 11 and locate the sound track with the axis of the opening 18. The members 13 can be easily stamped and embossed with the track 28 from a continuous sheet of the coated film.

The resilient flexible thin annular pad 14 is formed of a suitable polymeric material such as vinyl foam, and the pad has a radial dimension corresponding to or slightly greater than the radial dimension of the sound track on the sound track supporting member 13. The central opening 33 in the pad has a diameter corresponding to or slightly greater than the diameter of the opening 29 in the sound track medium 13.

The pad 14 serves to maintain a uniform contact and pressure between the sound track supporting medium and the transducer. When the transducer is a magnetic head this increases the life of the head by reducing the force applied to the head to maintain it in contact with the magnetizable coating on the member 13.

The plate 15 is formed on its front face with an annular recess 34 to accommodate the pad which recess surrounds a central truncated square aperture 36. The plate 15 is also formed with diagonally opposed holes 37 and 38 which are larger than and accommodate the bosses 26 and 27 on the main frame. The edges of the plate 15 have detents 39 formed thereon which are associated with the recesses 24 in the walls forming the recess 17 on the main frame 11 to provide the snap fit. The rear face 41 of the plate is formed with a pocket for receiving a slide mount. The pocket is formed by a recess 42 in the rear face 41 of the plate positioned about the aperture 36. The recess is bordered on substantially three sides by a raised rib 43 from which on opposed edges are outwardly extending flanges 44 adapted to hold a slide mount within the recess 42. The upper edge of the recess also has a segment-shaped off-set 46 permitting easy removal of a slide 16 from the recess 42. The depth of the recess 42 from the plane of the rear face 41 is slightly less than the thickness of the conventional pasteboard slide mounts permitting handling of the slide at its upper and lower edge to remove the same without difficulty from the pocket.

In the assembled form the sound track supporting member 13 is sandwiched between the wall 12 and plate 15 with the track 28 exposed through the enlarged opening 18 of the outer frame 11 and backed by the resilient pad 14. The main frame 11 and the plate 15 are provided with at least one detent or cooperating snap fastener at each edge of the plate to substantially eliminate any relative movement between the plate and the main frame. The plate 15 however is easily removed from the main frame by grasping the main frame and flexing it slightly at the edges to release the detents. By removal of the plate 15 the sound track supporting medium may be replaced or interchanged with another member if desired. The locating means in the form of the bosses 26 and 27 afford accurate positioning of each sound track member for maximum effective use of the sound track to record or reproduce information thereon by assuring that the transducer will move directly into the track upon placement thereof in the opening 18 and against the medium 13. The sound track 28 in its spiral form has a length to adequately record a description of the graphic image on the transparency and with the transducer moving in the track at an average rate of approximately 4 inches (10 cm.) per second, the recorded message can have a duration of approximately 40 seconds.

The truncated corner on the main frame 11, in its recess 17, on the sound track supporting medium 13, and on the plate 15 is provided to visually aid in rapid alignment of the elements and to aid in mechanical orientation of the elements and the assembled unit. The terms "front," "rear," "top" etc. are used to aid in describing the invention and are accordingly relative and not limiting.

Having thus described the present invention what is claimed is:

1. A transparency and sound track supporting assembly comprising
   a rectangular frame having a planar side wall and a peripheral rib defining a rectangular recess opposite the planar surface, means defining a large opening in said side wall and locating means formed on said supporting frame within said recess,
   a sound track supporting member disposed in said recess, means defining a sound track on one face of said support-member, said member having means associated with said locating means to accurately register said sound track with said opening, and an opening disposed generally centrally of said member, and
   a plate having a size to fit within said recess and sandwiching said sound track supporting member between said plate and said frame, said plate having means for retaining the plate in said recess, a central aperture in said plate disposed within and aligned with the opening in said sound track supporting member and said plate having means defining a pocket for receiving and retaining a transparency and positioning said transparency over said aperture.

2. A transparency and sound track supporting assembly according to claim 1 wherein said sound track supporting member comprises a thin generally rectangular sheet of material with a magnetizable coating on one face and an embossed area forming a spiral sound track on said one face.

3. A transparency and sound track supporting assembly according to claim 2 comprising
   means defining an annular recess in one face of said plate corresponding dimensionally to the size of said sound track and formed with a generally rectangular recess and rib members on the opposite external face to form said transparency receiving pocket, and
   a resilient pad disposed within said annular recess for providing a resilient backing to said sound track supporting member.

4. A transparency and sound track supporting assembly affording interchangeability and replacement of the transparency and of the sound track supporting medium, said assembly comprising
   a thin, rectangular main frame having one planar face and a recessed opposite surface, means defining a large central circular opening in said one face, and locating means formed on said main frame within said recess,
   a sound track supporting member disposed in said recess, means defining a sound track on one face of said supporting member, said member having means cooperating with said locating means for disposing said sound track in register with said circular opening, and having an opening disposed generally centrally of said member,
   resilient support means disposed in contacting relation to said supporting member on the face thereof opposite said track, and
   a plate having a size to fit within said recess and sandwich said resilient support means and said sound track supporting member between said plate and said main frame, said plate having means for releasably retaining the plate in said recess and having a central aperture disposed within the opening in said sound track supporting member, and said plate having means defining a pocket for receiving, retaining, and positioning a said transparency at said aperture.

5. A transparency and sound track supporting assembly according to claim 4 wherein said sound track supporting member comprises a thin generally rectangular sheet of material with a magnetizable coating on one face and an embossed area forming a spiral track on said one face.

6. A transparency and sound track supporting assembly according to claim 4 wherein said plate is formed with an annular recess in one face to receive said resilient support means and is formed with a generally rectangular recess and rib members on the opposite face to form said transparency receiving pocket.

7. A transparency and sound track supporting assembly according to claim 4 wherein said recessed opposite surface of said main frame is defined by at least four walls positioned normal to each other and normal to said opposite surface to form a generally rectangular recess, said walls being formed with recessed areas and detents, said recesses cooperating with detents on the edge walls of said plate to provide a snap fit for said plate in said rectangular recess.

8. A transparency and sound track supporting assembly wherein the sound track is disposed around a central opening through which light would pass to project a transparency, said assembly being formed of separate pieces fitted and mechanically held together as a unit affording interchangeability and replacement of the transparency and of the sound track supporting medium, said assembly comprising a molded generally rectangular main frame having a side wall with one planar face and a peripheral rib formed on the opposite face thereof defining a generally rectangular recessed opposed surface, a circular beveled wall defining a large circular opening in said side wall, and locating means formed on said opposite face within said recess in the form of diagonally positioned bosses, a sound track supporting member disposed in said recess, means defining a sound track on one face of said supporting member, said member having holes associated with said bosses to dispose said sound track in register with said circular opening, and having a central opening disposed centrally of said member, an annular flexible resilient support pad disposed in contacting relation to said supporting member on the face thereof opposite said track, said pad having a central opening corresponding generally to the central opening in said supporting member, a plate having a size to fit within said recess and sandwich said resilient support pad and said sound track supporting member between said plate and said opposite face of said side wall of said frame, said plate having mechanical fastening means for releasably retaining the plate in said recess, and having a central aperture smaller than said central openings, and having frame means defining a pocket for slidably receiving and retaining a slide mount and for positioning a said transparency carried thereby at said aperture.

References Cited

UNITED STATES PATENTS

| 3,240,117 | 3/1966 | Wickstrom et al. | 353—19 |
| 3,270,614 | 9/1966 | Paull | 353—120 |
| 3,282,154 | 11/1966 | Dimitracopoulos et al. | 353—120 |

HARRY N. HAROIAN, Primary Examiner

U.S. Cl. X.R.

353—19